US 8,390,859 B2

(12) United States Patent
Watanabe

(10) Patent No.: US 8,390,859 B2
(45) Date of Patent: Mar. 5, 2013

(54) IMAGE FORMING DEVICE AND IMAGE FORMING METHOD FOR PRINTING TRANSPARENT DEVELOPERS WITH DIFFERENT PARTICLE SIZES

(75) Inventor: Tetsuya Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 308 days.

(21) Appl. No.: 12/654,225

(22) Filed: Dec. 15, 2009

(65) Prior Publication Data
US 2010/0165398 A1 Jul. 1, 2010

(30) Foreign Application Priority Data

Dec. 26, 2008 (JP) ................................ 2008-332096

(51) Int. Cl.
*G06F 15/00* (2006.01)
(52) U.S. Cl. ...... 358/1.15; 358/3.28; 347/100; 347/106; 428/32.2; 428/32.3; 382/100; 399/82; 399/233; 399/341
(58) Field of Classification Search .................. 358/1.15, 358/3.28; 347/100, 106; 428/32.2, 32.3; 382/100; 399/82, 233, 341
See application file for complete search history.

(56) References Cited

U.S. PATENT DOCUMENTS

| 2005/0179759 A1* | 8/2005 | Yoshida et al. ............... 347/105 |
| 2005/0196203 A1* | 9/2005 | Tsuda et al. .................. 399/341 |
| 2006/0216048 A1* | 9/2006 | Fujii et al. ....................... 399/45 |
| 2007/0065735 A1* | 3/2007 | Kim ................................. 430/7 |

FOREIGN PATENT DOCUMENTS

| JP | 06-328642 | * 11/1994 |
| JP | A-H07-248662 | 9/1995 |
| JP | A-H11-249375 | 9/1999 |
| JP | A-2002-207334 | 7/2002 |
| JP | 2008-151851 | * 7/2008 |
| JP | A-2009-37102 | 2/2009 |

OTHER PUBLICATIONS

JP 2008-151851 (machine translation).*
JP 06-328642 (machine translation).*

* cited by examiner

*Primary Examiner* — Qian Yang
(74) *Attorney, Agent, or Firm* — Posz Law Group, PLC

(57) ABSTRACT

An image forming device includes a first development unit configured to form a first image on a recording medium with a first developer, a second development unit configured to form a second image on the recording medium with at least one of a plurality of second developers that are different from the first developer, and a print control unit configured to select the at least one of the plurality of second developers for forming the second image. The second developers are transparent developers, and the second image is a transparent image.

11 Claims, 11 Drawing Sheets

IMAGE FORMING DEVICE AND IMAGE FORMING METHOD FOR PRINTING TRANSPARENT DEVELOPERS WITH DIFFERENT PARTICLE SIZES

CROSS REFERENCE

The present application is related to, claims priority from and incorporates by reference Japanese patent application number 2008-332096, filed on Dec. 26, 2008.

TECHNICAL FIELD

The present invention relates to an image forming device that uses an electrophotographic recording system, for example, a printer, a facsimile machine, or a copying machine.

BACKGROUND

In a conventional image forming device that uses an electrophotographic recording system, the following processes are performed: a recording medium stored in a cassette or the like is fed out; an electrostatic latent image is formed on a photoreceptor drum; toner is adhered to the photoreceptor drum; the toner is transferred to the recording medium; and a toner image is fused on the recording medium. Japanese laid-open patent publication number H7 (1995)-248662 disclosed a technology that enables the production of a glossy printed image having an image quality such as silver halide photography. In addition to color toner of yellow toner, magenta toner, cyan toner and black toner, transparent toner is used. Toner adherence amount is calculated based on the density of a manuscript. And then, the transparent toner is added so as to make certain that the total toner adherence amount is a certain value or more.

However, there is a problem that this did not always achieve the expected result, even though the transparent toner is added so as to have the total toner adherence amount at a certain value. That is because a quality of the recording mediums varies. In other words, when the total toner adherence amount is even on a transferring belt and a photoreceptor drum, the total toner adherence amount is not uniform on a surface of a printed image because of an unevenness of the surface of the recording medium so that desired gloss is not obtained. This means that in order to obtain the desired gloss, the recording medium is limited to flat and glossy paper. Therefore, there is a problem that it is hard to obtain the desired gloss depending on the type of recording mediums.

An object of the present application is to provide an image forming device that obtains desired gloss on a surface of a printed image regardless of the type of the recording mediums.

SUMMARY

In order to resolve the problem described above, an image forming device of the present application includes: a first development unit configured to form a first image on a recording medium with a first developer; a second development unit configured to form a second image on the recording medium with at least one of a plurality of second developers that are different from the first developer; and a print control unit configured to select the at least one of the plurality of second developers for forming the second image, wherein the second developers are transparent developers, and the second image is a transparent image. Further, in the present application, input information is defined as any information that is used for selecting a proper recording medium. The input information includes information, for example, that is input by an operation unit, that is received by an interface unit, or that is detected by a surface detection unit.

It is preferable that the image forming device further includes the first development unit and the second development unit are arranged to face the intermediate transferring unit, the first development unit is configured to transfer the first image to the intermediate transferring unit, the second development unit is configured to transfer the second image to the intermediate transferring unit, and the intermediate transferring unit is configured to simultaneously transfer the first image and the second image from the intermediate transferring unit to the recording medium. Herein, the intermediate transferring unit is configured to receive transfer toner image from a photoreceptor drum, then transfer the image to a medium. Practically, the intermediate transferring unit relates to, for example, an intermediate transferring belt 11 below.

Further, the image forming device might includes an intermediate transferring unit that is an endless belt on which the first and second images are formed. The second development unit is configured to directly develop the second image on the intermediate transferring unit. Namely, the second image is developed on the intermediate transferring unit without a photoreceptor drum.

Also, an image forming method of the present application includes selecting a recording medium for receiving a first image made with a first developer; selecting a second developer for forming a second image from a plurality of possible second developers based on a surface characteristic of the recording medium; determining whether or not a base part of the second image is formed below the first image; forming the second image on the recording medium as a base layer when it is determined that the base part of the second image is to be formed below the first image; forming the first image over the recording medium after forming the second image as a base layer.

An image forming method of the present application may include selecting a recording medium for receiving a first image made with a first developer based on input date; selecting a second developer for forming a second image from among a plurality of possible second developers based on a surface characteristic of the recording medium; forming the first image on the recording medium; determining whether or not the second image is formed over the first image based on print data; and forming the second image on the first image when it is determined that the second image is formed over the first image. The print date in the disclosure of the application is defined as date including not only image data but other data also. The image data is mainly used to form an image printed on a medium. The other date means a command (command data) that is used to instruct the printer and that sets any instructions for the printer.

According to the present invention, the desired gloss is more frequently obtained on the surface of printed image even if various types of recording mediums are used

BRIEF DESCRIPTION OF THE DRAWINGS

DETAILED DESCRIPTION (First Embodiment) FIG. 1 is a sectional view of a printer 1 of a first embodiment. The printer 1, which is an image forming device, has a medium cassette 3. The medium cassette 3 stores a first recording medium 2, which is a medium before printing. On the other hand, a medium cassette 4, which is attached to the printer 1, stores a second recording medium 5 that is a different kind of medium compared with the first recording medium 2.

Figure 1:
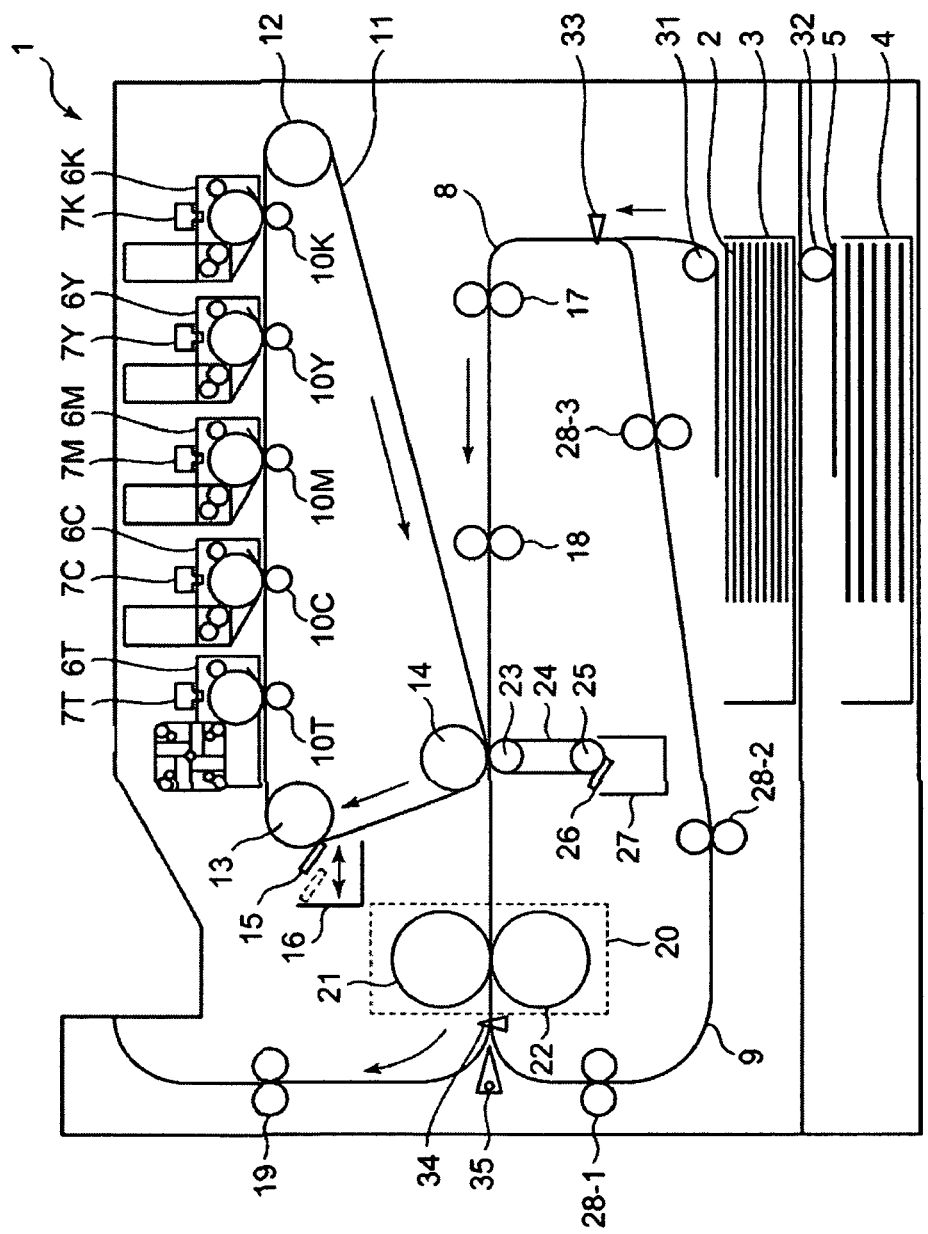
FIG. 1 is a sectional view of a printer of a first embodiment.

The printer 1 is capable of color printing. Therefore, the printer 1 has image drum units 6K, 6Y, 6M and 6C (hereinafter referred to as ID units), which are image forming units. The ID units 6K-6C accommodate four kinds of color toner as color developers, which are black (K) toner, yellow (Y) toner, magenta (M) toner, and cyan (C) toner. In the present disclosure, the developer includes various types of image-making material with which an image is formed on a recording medium. For example, toner and inks are available for the developer. Images that are developed with color developers are defined as color images or first images. Furthermore, the printer 1 has an ID unit 6T that accommodates a transparent toner (T) as a transparent developer having several kinds of particle size, as discussed later. Each of these ID units 6K-6T is provided to form a developer image and is detachable from the printer 1. The printer 1 has LED heads 7K, 7Y, 7M, 7C and 7T that form an electrostatic latent image through irradiating light to the ID units 6K-6T.

An intermediate transferring belt 11 is put around a drive roller 12, a belt driven roller 13, and a secondary transferring backup roller 14 and is rotated by the drive roller 12. An upper surface part of the intermediate transferring belt 11 is arranged to be movable between primary transferring rollers 10K, 10Y, 10M, 10C, and 10T and the ID units 6K-6T. A development image formed by the ID units 6K-6T is temporarily transferred on the intermediate transferring belt 11. The disclosed intermediate transferring belt 11 is configured as an endless belt without any joins and is made of a high-resistance and semi-conducting plastic film.

In a side surface part of the intermediate transferring belt 11, a cleaning blade 15 is arranged to contact the intermediate transferring belt 11 and to face the belt driven roller 13. Adhered materials, such as toner, are scraped by the cleaning blade 15 and are stored in a cleaner container 16. The cleaning blade 15 can be conveniently movable toward the position indicating dashed lines through a driving unit that is not shown.

A secondary transferring belt 24 is put around a secondary transferring roller 23 and a drive roller 25 and is rotated by the drive roller 25. The secondary transferring roller 23 is arranged to face the secondary transferring backup roller 14. Both the secondary transferring roller 23 and the secondary transferring backup roller 14 sandwich the intermediate transferring belt 11, the recording medium 2 or 5, and the secondary transferring belt 24. Under the structure discussed above, the development image that is temporarily transferred onto the intermediate transferring belt 11 is transferred onto the recording medium 2 or 5. The disclosed secondary transferring belt is configured as an endless belt without any joins and is made of a high-resistance and semi-conducting plastic film. A cleaning blade 26 is arranged to contact the secondary transferring belt 24 and to face the drive roller 25. Adhered materials, such as toner, scraped by the cleaning blade 26 are stored in a cleaner container 27.

The first recording medium 2 is pulled out one-by-one through a hopping roller 31 and a discrimination unit that is not shown, and is forwarded to a carrying path 8. The first recording medium 2 is carried to a nipping part between the intermediate transferring belt 11 and the secondary transferring belt 24 at certain timing by registration rollers 17 and carrying rollers 18. The second recording medium 5 is also pulled out one-by-one through a hopping roller 32 and a discrimination unit that is not shown, and is forwarded to the carrying path 8. The second recording medium 5 is carried to the nipping part between the intermediate transferring belt 11 and the secondary transferring belt 24 at certain timing by the registration rollers 17 and the carrying rollers 18.

In a fuser 20, toner adhered onto the first recording medium 2 or 5 is heated, melted, and pressed by a heat roller 21 that is a fusing part, and by a pressure application roller 22 that is a pressure application part. In this way, the toner image is fused onto the recording medium 2 or 5. The fused recording medium 2 or 5 is either forwarded to a re-carrying path 9 that is re-carrying the recording medium 2 or 5 or is ejected to the outside of the machine by a carrying separator 35 that is driven by a drive unit (not shown). The re-carrying path 9 goes through re-carrying rollers 28-1, 28-2, and 28-3 and is merged into the carrying path 8. The recording medium 2 or 5 is ejected to the outside of the machine by ejecting rollers 19. A start-working sensor 33 and an ejecting sensor 34 are mechanical sensors to acknowledge the passage of the recording medium 2 or 5 and to operate when the recording medium 2 or 5 passes.

Figure 2:
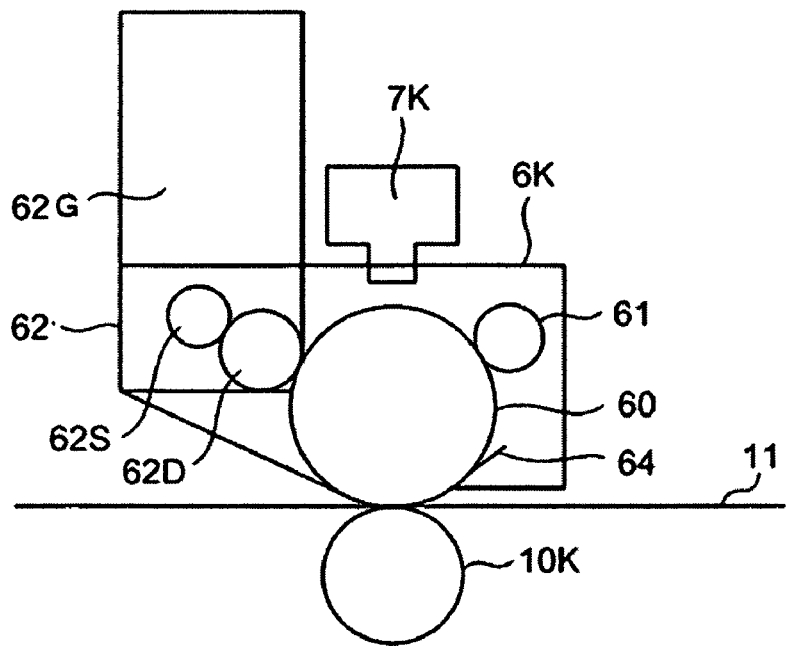
FIG. 2 is a schematic view of a structure of an ID unit 6K.

FIG. 2 is a schematic view of a structure of an ID unit 6K. Because the ID units 6K-6C that are capable of supplying color toner have the same structures, only the structure of the ID unit 6K is explained by way of example with reference to FIG. 2. The ID unit 6K has a photoreceptor drum 60 that serves as an image carrier. An electrostatic latent image is formed on the surface of the photoreceptor drum 60, and a charge roller 61 that is a charge unit uniformly charges the photoreceptor drum 60. The electrostatic latent image is formed on the surface of the photoreceptor drum 60 that is charged by irradiating light from the LED head 7K, which acts as an exposure unit.

The ID unit 6K further has a development unit 62 (operating as a first development unit) that develops the electrostatic latent image formed on the photoreceptor drum 60. The development unit 62 has the following structures: a developing roller 62D is a developer carrier to form a toner image; a supplying roller 62S supplies toner to the developing roller 62D and makes frictional electrification on the development roller 62D; and a toner cartridge 62G is a developer container unit to store toner that is supplied to the supplying roller 62S. The toner cartridge 62G is detachable from the development unit 62. Under the structure discussed above, the ID unit 6K transfers the toner image formed on the photoreceptor drum 60 to the intermediate transferring belt 11. The ID unit 6K also has a cleaning blade 64 to remove remaining toner on the surface of the photoreceptor drum 60.

Figure 3:
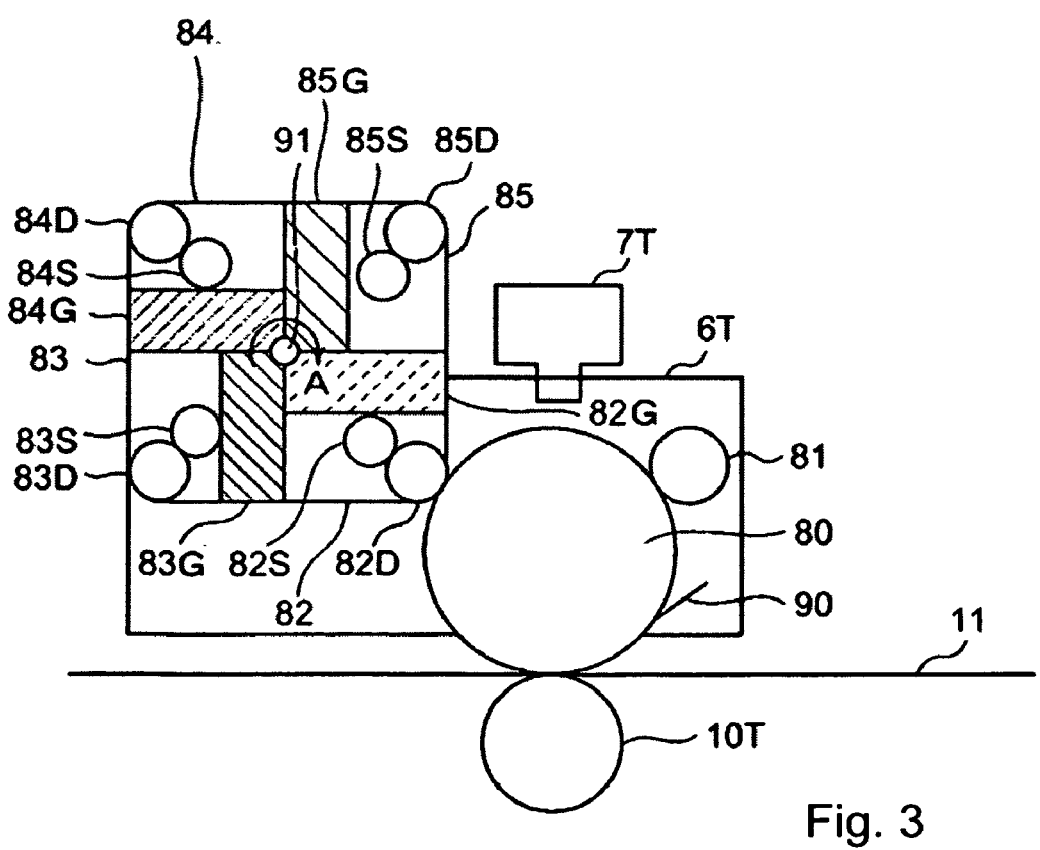
FIG. 3 is a schematic view of a structure of an ID unit 6T.

FIG. 3 is a schematic view of a structure of an ID unit 6T. The ID unit 6T is an ID unit that is capable of supplying transparent toner (T). The ID unit 6T, which is capable of supplying transparent toner (T), has a photoreceptor drum 80 in which an electrostatic latent image is formed on the surface and a charge roller 81 to uniformly charge the photoreceptor drum 80. The electrostatic latent image is formed on the surface of the photoreceptor drum 80 that is charged by irradiating light from the LED head 7T.

The ID unit 6T further has a plurality of development units 82, 83, 84 and 85 (operating as a second development unit) that develop the electrostatic latent image formed on the photoreceptor drum 80. The development units 82-85 have the same structures and are held rotatable using a toner selection roller 91 as an axis. The development units 82-85 have the following structures: developing rollers 82D-85D to form toner images; and supplying rollers 82S-85S that supply toner to the developing rollers 82D-85D, and that make frictional electrification on the development rollers 82D-85D. In one of the development units 82-85, i.e., the development unit 82 in FIG. 3, the developing roller 82D develops the electrostatic latent image that is formed on the photoreceptor drum 80.

The development units 82-85 further have toner cartridges 82G, 83G, 84G and 85G to store toner for supplying to the supplying rollers 82S-85S. Each of the toner cartridges 82G-85G stores the transparent toner (T) with a different kind of particle size among the cartridges. The toner cartridges 82G-85G are detachable from the development units 82-85, respectively. The toner selection roller 91 is located in the center of the development units 82-85. The toner selection roller 91 rotates in a direction indicated by the directional arrow A by a toner selection motor 55 that is discussed later. The toner to be used is selected through a print setting and a medium setting discussed later.

The development units 82-85 are configured in a case having an overall cross section that is an approximate square shape, as shown in FIG. 3. The developing rollers 82D-85D are located on the corner of the approximate square shape. A part of the developing rollers 82D-85D is exposed from the case with the approximate square shape. Because the toner selection roller 91 rotates in the direction of the arrow A, one of the developing rollers 82D-85D is selected, and the electrostatic latent image formed on the photoreceptor drum 80 is developed. Under the structure discussed above, the ID unit 6T transfers the toner image formed on the photoreceptor drum 80 to the intermediate transferring belt 11. The ID unit 6T also has a cleaning blade 90 to remove remaining toner on the surface of the photoreceptor drum 80.

Figure 4:
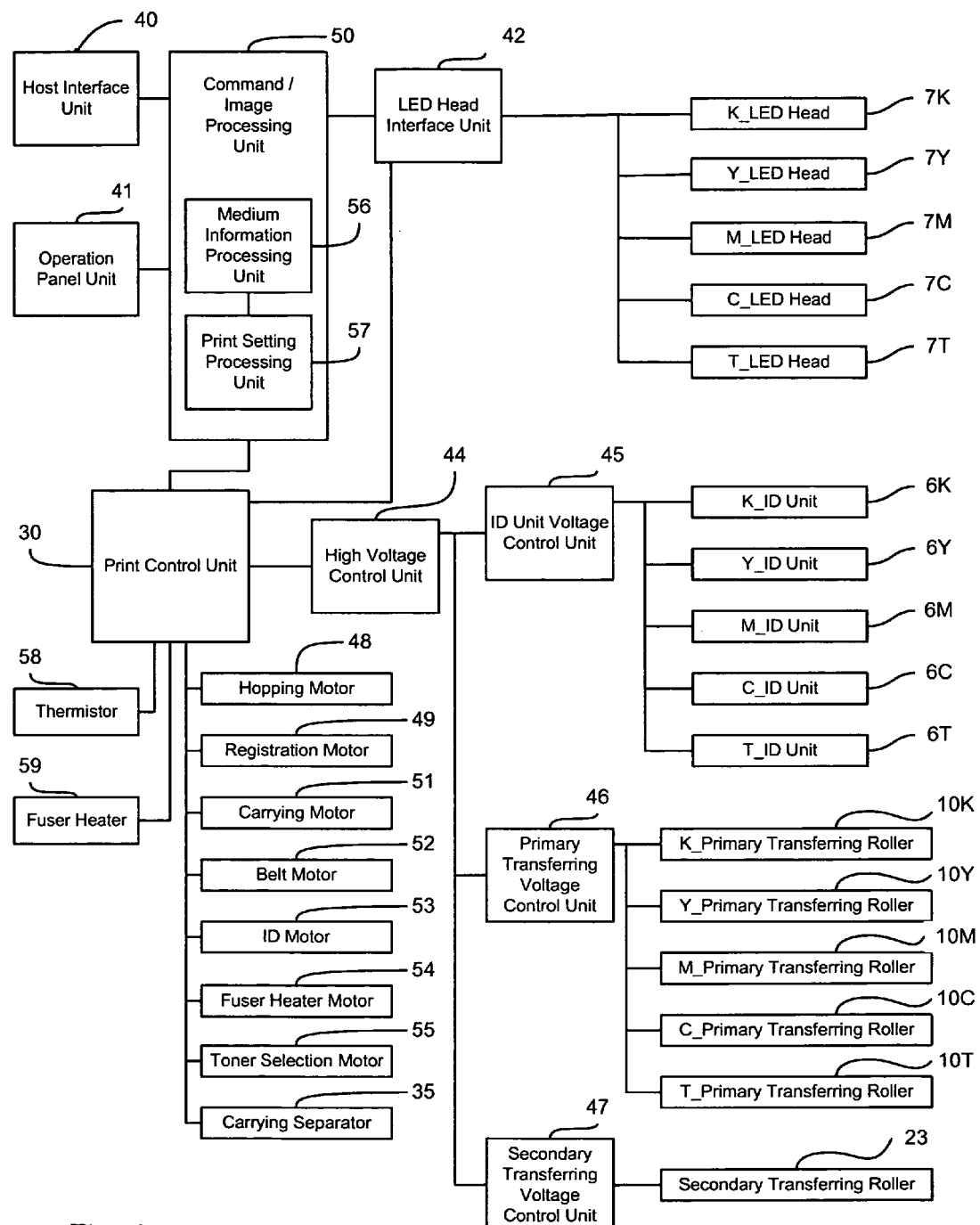
FIG. 4 is a control block diagram of a printer of a first embodiment.

In this embodiment, the selection of the development units 82-85 is provided through the "rotation" using the toner selection roller 91 as the center. However, so long as a structure is provided in which one of the development units 82-85 can be selected, alternate structures can be used. For example, an alternate embodiment could have the development units 82-85 slide in a horizontal direction FIG. 4 is a control block diagram of a printer of a first embodiment. A host interface unit 40 is configured to function as an interface with a host computer through the physical hierarchy. The host interface unit 40 operates as an interface unit that is configured to receive input information from the user (or the input information is input to the interface). An operation panel unit 41 is a panel that a user can operate and is configured to either mount on or attach to the printer 1. The operation panel unit 41 is an operation unit that is configured to receive input information from the user. A command/image processing unit 50 sends/receives data to/from the host interface unit 40 and the operation panel unit 41. The command/image processing unit 50 has a medium information processing unit 56 that processes information of the medium (or input information) obtained from the host interface unit 40 and the operation panel unit 41 and has a print setting processing unit 57.

The command/image processing unit 50 further construes commands and image data from a host side, or expands image data into a bitmap, and then outputs the expanded image data to an LED head interface unit 42. The LED head interface unit 42 processes the image data, which is expanded into the bitmap and comes from the command/image processing unit 50, to adjust it with interfaces of the LED heads 7K-7T.

A print control unit 30 analyzes and calculates information signals from each sensor and each unit, determines conditions, and outputs operation instruction signals to each unit so that the print control unit 30 generally provides structure unit control and applied voltage control. The print control unit 30 drives a hopping motor 48, a registration motor 49, a carrying motor 51, a belt motor 52, an ID motor 53, and a fuser heater motor 54 with a certain timing and speed. The print control unit 30 further drives a toner selection motor 55 and selects and applies one of the development units 82-85 that are provided in the ID unit 6T. The print control unit 30 keeps driving the toner selection motor 55 until the applied development units 82-85 contact the photoreceptor drum 80, and when the contact is occurred, the driving ends. The print control unit 30 also selectively drives a driving unit (not shown) for the carrying separator 35.

The temperature of a fuser heater 59 is controlled by the print control unit 30 based on a detection value of a thermistor 58. A high voltage control unit 44 receives a control value from the print control unit 30 and controls the voltages of an ID unit voltage control unit 45, a primary transferring voltage control unit 46, and a secondary transferring voltage control unit 47. The ID unit voltage control unit 45 controls a voltage that is applied to the ID units 6K-6T. The primary transferring voltage control unit 46 controls a voltage that is applied to the primary transferring rollers 10K-10T. The secondary transferring voltage control unit 47 controls voltage that is applied to the secondary transferring roller 23.

Figure 5:
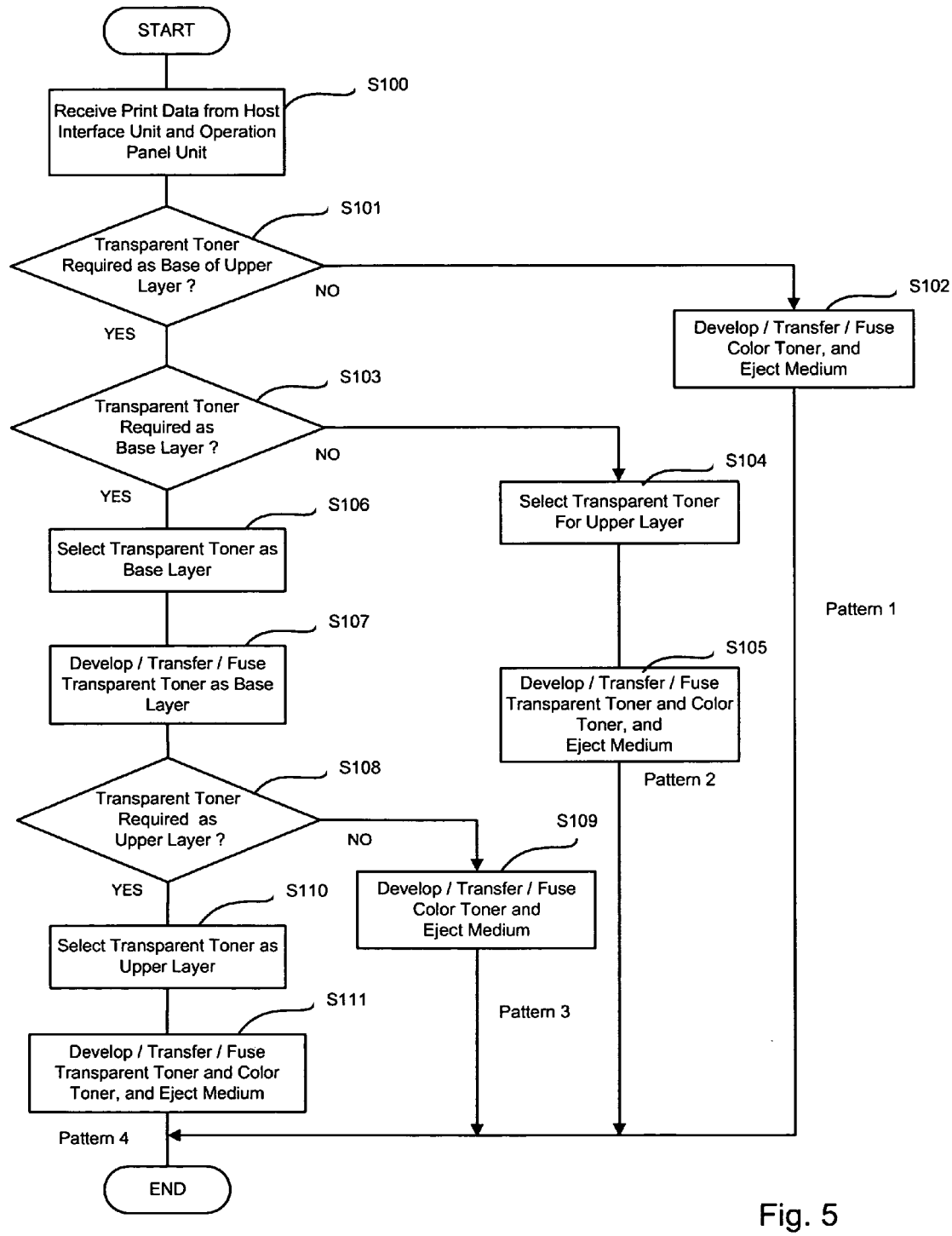
FIG. 5 is a flow diagram of operation of a printer of a first embodiment.

FIG. 5 is a flow diagram of the operation of a printer 1 of a first embodiment. The command/image processing unit 50 receives medium information and a print setting from the host interface unit 40 and the operation panel unit 41 and sends information to the print control unit 30 based on information from the medium information processing unit 56 and the print setting processing unit 57. The print control unit 30 receives print data from the host interface unit 40 and the operation panel unit 41 (S100). The print control unit 30 determines whether or not transparent toner is required as a base layer or an upper layer based on the print data (S101). Particularly, the print control unit 30 basically makes decisions based on information, such as a selected medium type or a selected tray, that is instructed on the operation panel unit 41. Information, such as settings of a type of medium or settings of a gloss image (or gloss image setting), is also used for the decisions, the information being analyzed in the host interface unit 40. The requirements of the transparent tonner image on the base layer is decided based on the information regarding the types of medium or tray instructed on the operation panel unit 41 or on the information regarding the settings of the type of medium analyzed in the host interface unit 40. The requirements of the transparent tonner image on the upper layer is decided based on the information regarding the gloss image setting analyzed in the host interface unit 40. For some types of mediums, the transparent toner image is required on the upper layer as well as on the base layer. Therefore, the requirement of the transparent tonner image for the upper layer might be decided based on the information regarding the type of medium or tray instructed on the operation panel unit 41 or on the information regarding the settings of the type of medium analyzed in the host interface unit 40. The base layer is defined as a base second image. The upper layer is defined as an upper second image. The details of this requirement are discussed later. When the print control unit 30 determines that the transparent toner is not required, the print control unit 30 selects color toner, black (K), yellow (Y), magenta (M) and cyan (C), sends a control value to each control unit for forming color toner image, and develops/transfers/fuses the color toner on a medium. As a result, the image that is configured by transferring toner in the following order from the bottom, K, Y, M and C, is printed on a recording medium 2 or 5. Then the print control unit 30 rotates the ejecting roller 19 by driving the carrying motor 51, and the recording medium 2 or 5 is ejected to outside of a machine (S102). The processes described above are referred to as pattern 1.

When the print control unit 30 determines that the transparent toner is required as the base layer or the upper layer in S101, the print control unit 30 further determines whether the transparent toner is required as the base layer for the recording medium 2 or 5 (S103). When the print control unit 30 determines that the transparent toner is not required as the base layer, the print control unit 30 selects the transparent toner that is required for the upper layer based on information sent from the command/image processing unit 50. The selection of the transparent toner is discussed later. The print control unit 30 rotates the toner selection roller 91 by driving the toner selection motor 55 in order to apply the selected transparent toner as the upper layer. The selected one of the development units 82-85 then contacts the photoreceptor drum 80 (S104). Next, the print control unit 30 develops toner in the order from the bottom, T, C, M, Y and K, on the intermediate transferring belt 11. Then, the print control unit 30 sends the control value to each control unit for transferring and fusing toner on the recording medium 2 or 5 at a time, so that the print control unit 30 develops/transfers/fuses the transparent toner and the color toner on the recording medium 2 or 5. As a result, the image that is configured by transferring toner in the following order from the bottom, K, Y, M, C and T, is printed on the recording medium 2 or 5. Then the print control unit 30 rotates the ejecting roller 19 by driving the carrying motor 51, and the recording medium 2 or 5 is ejected to outside of a machine (S105). The processes described above are referred to as pattern 2.

When the print control unit 30 determines that the transparent toner is required as the base layer in S103, the print control unit 30 selects the transparent toner that is required for the recording medium 2 or 5 based on information sent from the command/image processing unit 50. The print control unit 30 rotates the toner selection roller 91 by driving the toner selection motor 55 in order to apply the selected transparent toner as the base layer. In this way, the selected one of the development units 82-85 contacts the photoreceptor drum 80 (S106).

Next, the print control unit 30 develops/transfers/fuses the applied transparent toner on the recording medium 2 or 5 and forms a print image of the transparent toner on the recording medium 2 or 5. The print control unit 30 drives the carrying separator 35 to form an image on the print image of the transparent toner and provides a condition that is capable to further form an image on the transparent toner image through the re-carrying rollers 28-1, 28-2, and 28-3 (S107).

The print control unit 30 determines whether or not the transparent toner is further required as the upper layer (S108). When the print control unit 30 determines that the transparent toner is not required, the print control unit 30 selects the color toner. The print control unit 30 sends the control value to each control unit for forming color toner image, and develops/transfers/fuses the color toner on the recording medium in which the transparent toner is printed. As a result, the image that is configured by transferring toner in the following order from the bottom, T, K, Y, M and C, is printed on the recording medium 2 or 5. Then the print control unit 30 rotates the ejecting roller 19 by driving the carrying motor 51, and the recording medium 2 or 5 is ejected to outside of a machine (S109). The processes described above are referred to as pattern 3.

When the print control unit 30 determines that the transparent toner is required, the print control unit 30 drives the toner selection motor 55 and applies the transparent toner that is required as the upper layer (S110). Next, the print control unit 30 develops toner in the order from the bottom, T, C, M, Y and K, on the intermediate transferring belt 11.

The print control unit 30 sends the control value to each control unit for transferring and fusing toner on the recording medium 2 or 5 at a time, so that the print control unit 30 develops/transfers/fuses the transparent toner and the color toner on the recording medium 2 or 5. As a result, the image that is configured by transferring toner in the following order from the bottom, T, K, Y, M, C and T, is printed on the recording medium 2 or 5. Then the print control unit 30 rotates the ejecting roller 19 by driving the carrying motor 51, and the recording medium 2 or 5 is ejected to outside of a machine (S111). The processes described above are referred to as pattern 4.

The order of toner layers that are formed through the patterns 1-4 discussed above is shown in Table 1 below. Note that the order of the toner layers, from left to right, is a bottom most layer, a second layer, . . . , as the recording medium is a basis.

TABLE 1

| Pattern | Order of Toner Layer |
| --- | --- |
| Pattern 1 | K, Y, M, C |
| Pattern 2 | K, Y, M, C, T |
| Pattern 3 | T, K, Y, M, C |
| Pattern 4 | T, K, Y, M, C, T |

The print control unit 30 determines the necessity of the transparent toner as the base layer or the upper layer based on information from the host interface unit 40 and the operation panel unit 41 in S101. However, the print control unit 30 may determine the necessity of the transparent toner based on Table 1 when one of the patterns 1-4 for forming toner layers is inputted. Alternatively, when information from the host interface unit 40 and the operation panel unit 41 is a type of the recording medium 2 or 5, the print control unit 30 may determine the patterns 1-4 based on the type of the recording medium 2 or 5. For example, if a recording medium is a recycled paper, it determines the patter 4; if a recording medium is a regular paper, it determines the pattern 3; if a recording medium is a high quality paper, it determines the pattern 2; and if a recording medium is a glossy paper, it determines the pattern 1.

Features of an embodiment are to select the transparent toner used depending on a surface roughness of the recording medium 2 or 5, when a plurality of the transparent toner that has several kinds of particle size is used. When the recording mediums 2 and 5 are recycled paper, a regular paper and a high quality paper, the relationship of the surface roughness (Rz) among the mediums is generally shown as follows:

(Large Surface Roughness)        (Small Surface Roughness)    (4.1)

Recycled Paper > Regular Paper > High Quality Paper

Particle sizes of transparent toner used are 10 μm, 7 μm, 5 μm, and 3 μm. A particle size of color toner is 7 μm. These several kinds of transparent toner with a different particle size are provided to the toner cartridges 82G-85G, respectively, to supply the transparent toner with the different particle size to the development units 82, 83, 84 and 85, respectively. While selecting each transparent toner, the setting of the ID unit 6T for transparent toner is shown in Table 2 below.

TABLE 2

| Transparent Toner No. | Development Unit No. | Cartridge No. | Particle Size | Application |
|---|---|---|---|---|
| T1 | 82 | 82G | 7 μm | Upper Layer on Color Toner (same particle size as color toner) |
| T2 | 83 | 83G | 5 μm | Base Layer for Regular Paper |
| T3 | 84 | 84G | 3 μm | Base Layer for High Quality Paper |
| T4 | 85 | 85G | 10 μm | Base Layer for Recycled Paper |

A particle size of the transparent toner T1 is the same as that of the color toner. The transparent toner T1 is set to fix as the upper layer on the color toner seen from the recording medium 2 or 5. Because the particle sizes of the transparent toner and the color toner are same, the transparent toner efficiently compensates the differences of amount of the color toner on the recording medium 2 or 5. Therefore, the transparent toner is used to restrict decrease of the glossiness due to irregularity of the surface of the color toner on the recording medium 2 or 5.

The transparent toner T2, T3 and T4 are set to fix as the base layer under the color toner with respect to the recording medium 2 or 5 made of, for example, a regular paper, a high quality paper, and a recycled paper. The transparent toner is used to restrict decrease of the glossiness due to irregularity of the surface of the recording medium 2 or 5 itself. The relationship of surface roughness of the recording medium 2 or 5 is shown in the expression (4.1) so that particle sizes of the transparent toner are configured as follows:

(Large Particle Size)        (Small Particle Size)    (4.2)

T4 (10 μm) > T2 (5 μm) > T3 (3 μm)

(Exemplary Embodiment) A detailed embodiment is explained below. A regular paper is set as the first recording medium 2, and a recycled paper is set as the second recording medium 5. An operation to obtain high gloss for each of the recording mediums 2 and 5 is explained. In order to obtain the high gloss, the pattern 4 explained in the flow diagram in FIG. 5 is performed.

When the command/image processing unit 50 receives a color print instruction for a regular paper, the medium information processing unit 56 and the print setting processing unit 57 select the first recording medium 2 (regular paper) and send data to the print control unit 30. In order to decrease the glossiness due to irregularity of the surface of the regular paper, the print control unit 30 selects transparent toner as a base layer for the regular paper. Because the transparent toner for the regular paper is mounted in the transparent toner T2, the print control unit 30 applies T2 by driving the toner selection motor 55. The print control unit 30 further sends a control value to each control unit to develop/transfer/fuse under the regular paper setting. Because the print control unit 30 develops/transfers/fuses the transparent toner T2 as the base layer on the first recording medium 2 (regular paper), the first recording medium 2 on which image of the transparent toner T2 is formed is created.

The print control unit 30 then forwards the first recording medium 2 (regular paper) to the carrying path 8 through the re-carrying path 9 to form a further image on the first recording medium 2 by driving the carrying separator 35. As a result, the print control unit 30 makes the first recording medium 2 into the condition where further image can be formed on the first recording medium 2 (regular paper) on which the image of the transparent toner T2 is formed. At the same time, the print control unit 30 applies and selects the transparent toner T1, which has the same particle size as the color toner has, by driving the toner selection motor 55. Next, the print control unit 30 develops toner in the order from the bottom, T1, C, M, Y and K, on the intermediate transferring belt 11. The print control unit 30 sends the control value to each control unit for transferring and fusing toner on the first recording medium 2 (regular paper) at a time and for equalizing toner development amount of the transparent toner as the upper layer and the color toner. This allows the print control unit 30 to develop/transfer/fuse the transparent toner and the color toner on the first recording medium 2 (regular paper).

Because the transparent toner T2 as the base layer is already formed on the first recording medium 2 (regular paper), the toner layers that is printed on the first recording medium 2 (regular paper) are configured with the following order from the bottom, T2, K, Y, M, C and T1. As a result, the printed first recording medium 2 (regular paper) is ejected to outside of a machine through the ejecting roller 19, and the high gloss print image can be obtained.

In the case of a recycled paper, the high gloss print image can be obtained when the pattern 4 in the flow diagram in FIG. 5 is also performed with the selection of the transparent toner T4 as the base layer. In the case of a glossy paper in which a coating is already provided at the medium surface, and it is not necessary to have the transparent toner as the base layer for the recording 2 or 5, the high gloss print image can be obtained when the pattern 2 in the flow diagram in FIG. 5 is also performed with the selection of the transparent toner T1 as the upper layer. Therefore, even though mediums are of great variety, a high gloss print image can be obtained by performing the embodiment discussed above.

In the present embodiment, the selection of the transparent toner that has a certain particle size as the base layer is dependent on the surface roughness of the recording medium 2 or 5. A value (Rz) of the surface roughness of the recording medium 2 or 5 is obtained by inputting a measured value by a user in advance through the operation panel unit 41 or through the host interface unit 40 and a host computer. The medium information processing unit 56 and the print setting processing unit 57 process the inputted value (Rz) of the surface roughness so that the transparent toner with a certain particle size can be automatically selected based on the value. Alternatively, when the setting for a regular paper, a high quality paper, and a recycled paper is performed, the transparent toner can be selected. Namely, the setting for the regular paper, the high quality paper, and the recycled paper is inputted through the operation panel 41 or through the host interface unit 40 and the host computer. Further alternatively, when the medium information processing unit 56 memorizes the value (Rz) of the surface roughness for the regular paper, the high quality paper, and the recycled paper, the medium information processing unit 56 and the print setting processing unit 57 process the inputted value (Rz) of the surface roughness so that the transparent toner with a certain particle size can be automatically selected based on the value.

The present embodiment includes the ID units 6K-6C, which are for the color toner to form color toner image on the recording medium 2 or 5, and the ID unit 6T, which forms transparent toner image on the recording medium with the transparent toner selected from a plurality of transparent toners. Therefore, the present embodiment can select the transparent toner as the base layer or the upper layer based on the type of the recording medium even though the surface roughness of the recording medium is different; it can equalize any irregularity of the surface of the recording mediums and of toner image; and it can obtain a high gloss print image medium.

(Second Embodiment) A second embodiment is explained below. The first embodiment as shown in FIG. 3 transfers the transparent toner image formed on the photoreceptor drum 80 to the intermediate transferring belt 11. In contrast, the second embodiment directly transfers the transparent toner to the intermediate transferring belt 11 without the photoreceptor drum 80 as shown in FIG. 6 when the transparent toner image is formed on the whole surface of the recording medium 2 or 5.

Figure 6:
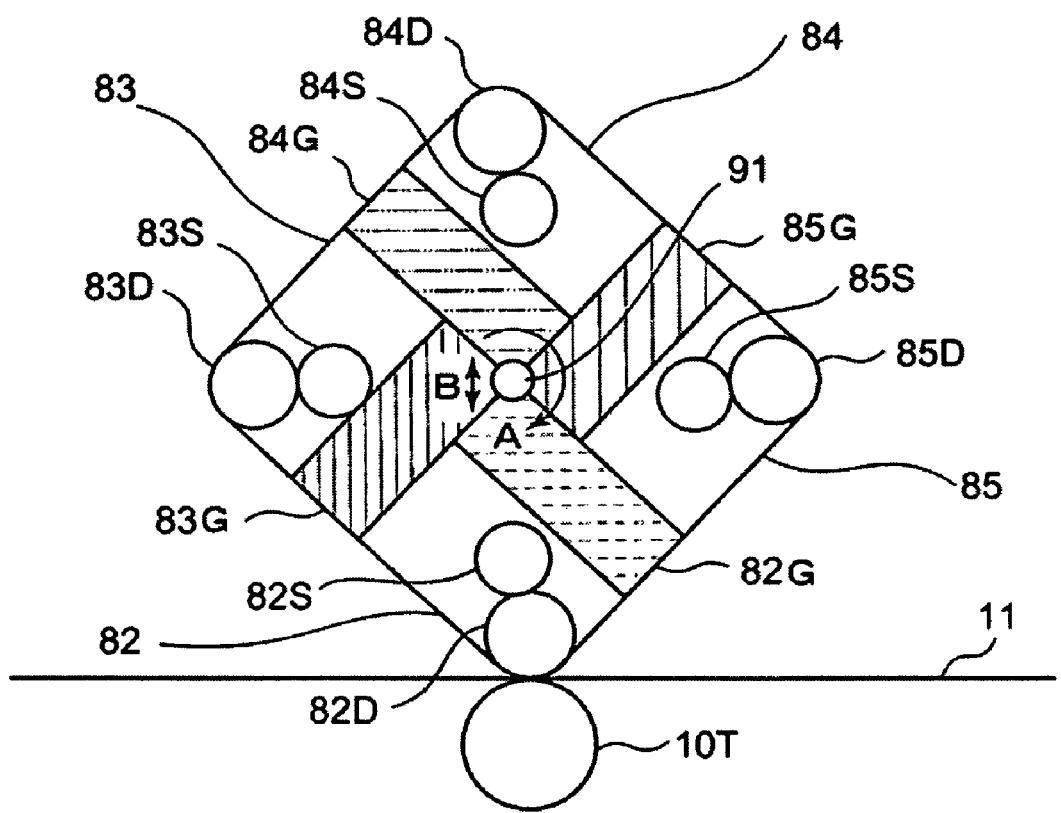
FIG. 6 is a schematic view of a development unit of a second embodiment.

FIG. 6 is a schematic view of development units 82-85 of a printer 1 according to the second embodiment. The development units 82-85 (acting as a second development unit) supply the transparent toner (T) to transfer on a full width of the intermediate transferring belt 11. The development units 82-85 have the same structures and are held rotatable using a toner selection roller 91 a an axis. The development units 82-85 have the following structures: developing rollers 82D-85D to supply toner images; and supplying rollers 82S-85S that supply toner to the developing rollers 82D-85D and that make frictional electrification on the development rollers 82D-85D. In one of the development units 82-85, i.e., the development unit 82 in FIG. 6, the developing roller 82D supplies a transparent toner (T) that is transferred on a full width of the intermediate transferring belt 11.

The development units 82-85 further have toner cartridges 82G, 83G, 84G and 85G to store toner to be supplied to the supplying rollers 82S-85S. Each of the toner cartridges 82G-85G stores a transparent toner (T) with a different kind of particle size among the cartridges. The toner cartridges 82G-85G are detachable from the development units 82-85, respectively. The toner selection roller 91 is located in the center of the development units 82-85. The toner selection roller 91 rotates in a direction indicated by the directional arrow A in response to a toner selection motor 55 that is discussed later. The toner to be used is selected through a print setting and a medium setting discussed later.

The development units 82-85 are configured in a case that has an overall cross section that is an approximate square shape, as shown in FIG. 3. The developing rollers 82D-85D are located on the corners of the approximate square shape. A part of the developing rollers 82D-85D is exposed from the case with the approximate square shape. Because the toner selection roller 91 rotates in the direction of the arrow A, one of the developing rollers 82D-85D is selected, and the transparent toner is supplied/transferred as the base layer or the upper layer for the color toner over a full width of the intermediate transferring belt 11.

In this embodiment, the selection of the development units 82-85 is provided through the "rotation" using the toner selection roller 91 as the center. However, so long as a structure in which one of the development units 82-85 can be selected, alternate structures can be used. For example, an alternate embodiment could have the development units 82-85 slide in a horizontal direction. The toner selection roller 91 is also movable in a direction indicated by the directional arrow B, i.e., the developing roller 82D is movable in a direction away from the intermediate transferring belt 11. As a result, the transparent toner can be formed not only on a whole surface of the first recording medium 2 or 5, but also on a certain length in the carrying direction of the recording medium 2 or 5.

Because the second embodiment does not have the photoreceptor drum 80, the charge roller 81 and the LED head 7T in particular for the transparent toner and have development units 82-85 that directly transfer the transparent toner to the intermediate transferring belt 11. As a result, it is possible to have the transparent toner as the base layer or the upper layer for the color toner printed on a whole surface of the recording medium 2 or 5. Furthermore, because in the second embodiment, the developing roller 82D can be movable in a direction away from the intermediate transferring belt 11, it is possible that the transparent toner as the base layer or the upper layer for the color toner can be printed on whole surface or only along a certain length of the recording medium 2 or 5.

Figure 7:
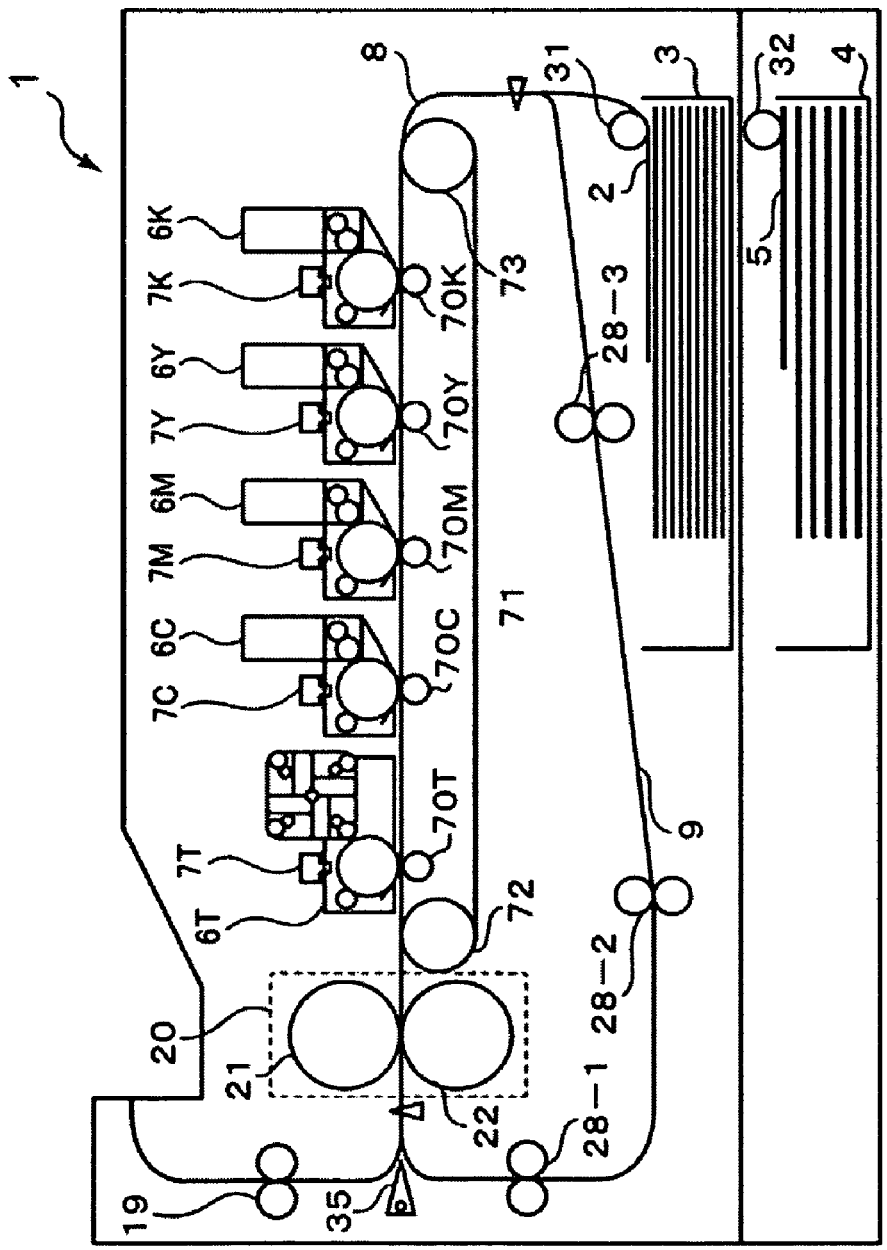
FIG. 7 is a sectional view of a printer of a third embodiment.

(Third Embodiment) Next, a third embodiment is explained below. In the first embodiment, the transparent toner is printed on a medium through the intermediate transferring belt 11. In the third embodiment, as shown in FIG. 7, development image formed on the photoreceptor drum 60 is directly transferred on the recording medium 2 or 5 without the intermediate transferring belt 11. Namely, the image is transferred from a transferring unit to recording medium in the embodiment.

FIG. 7 is a sectional view of a printer 1 of the third embodiment. A medium cassette 3 stores a first recording medium 2, which is a medium before printing. In addition, a medium cassette 4, which is attached to the printer 1, stores a second recording medium 5 that is a different kind of medium compared to the first recording medium 2.

The printer 1 is capable of color printing. Therefore, the printer 1 has ID units 6K-6C. The ID units 6K-6C accommodate four kinds of color toner: black (K) toner, yellow (Y) toner, magenta (M) toner, and cyan (C) toner. In addition, the printer 1 has an ID unit 6T that accommodates transparent toner (T) having several kinds of particle size. Each of these ID units 6K-6T is provided to form a developer image and is detachable from the printer 1. The printer 1 also includes LED heads 7K-7T that form an electrostatic latent image through irradiating light onto the ID units 6K-6T.

A transferring belt 71 is provided under the ID units 6K-6T. The recording medium 2 or 5 is carried on the transferring belt 71. The transferring belt 71 is put around a drive roller 72 and a belt driven roller 73. The transferring belt 71 is movable between transferring rollers 70K, 70Y, 70M, 70C and 70T and the ID units 6K-6T in response to the drive roller 72.

As a result, a development image formed by the ID units 6K-6T is transferred onto the recording medium 2 or 5 through the function of the transferring belt 71. The disclosed transferring belt 71 is configured as an endless belt without any joins and is made of a high-resistance and semi-conducting plastic film.

The first recording medium 2 is pulled out one-by-one through a hopping roller 31 and a discrimination unit that is not shown and is forwarded to a carrying path 8. The first recording medium 2 is carried to an area between the transferring rollers 70K-70T and the ID units 6K-6T according to a certain timing. The second recording medium 5 is also pull out one-by-one through a hopping roller 32 and a discrimination unit that is not shown and is forwarded to the carrying path 8. The second recording medium 5 is carried to the area between the transferring rollers 70K-70T and the ID units 6K-6T at certain timing.

In a fuser 20, toner adhered on the recording medium 2 or 5 is heated, melted, and pressed by a heat roller 21 and by a pressure application roller 22, causing a toner image to be fused on the recording medium 2 or 5. The fused recording medium 2 or 5 is either forwarded to a re-carrying path 9 that re-carries the recording medium 2 or 5, or it is ejected to the outside of the machine by a carrying separator 35 that is driven by a drive unit (not shown). The re-carrying path 9 goes through re-carrying rollers 28-1, 28-2, and 28-3 and is merged into the carrying path 8. The recording medium 2 or 5 is ejected to outside of the machine by ejecting rollers 19.

Figure 8:
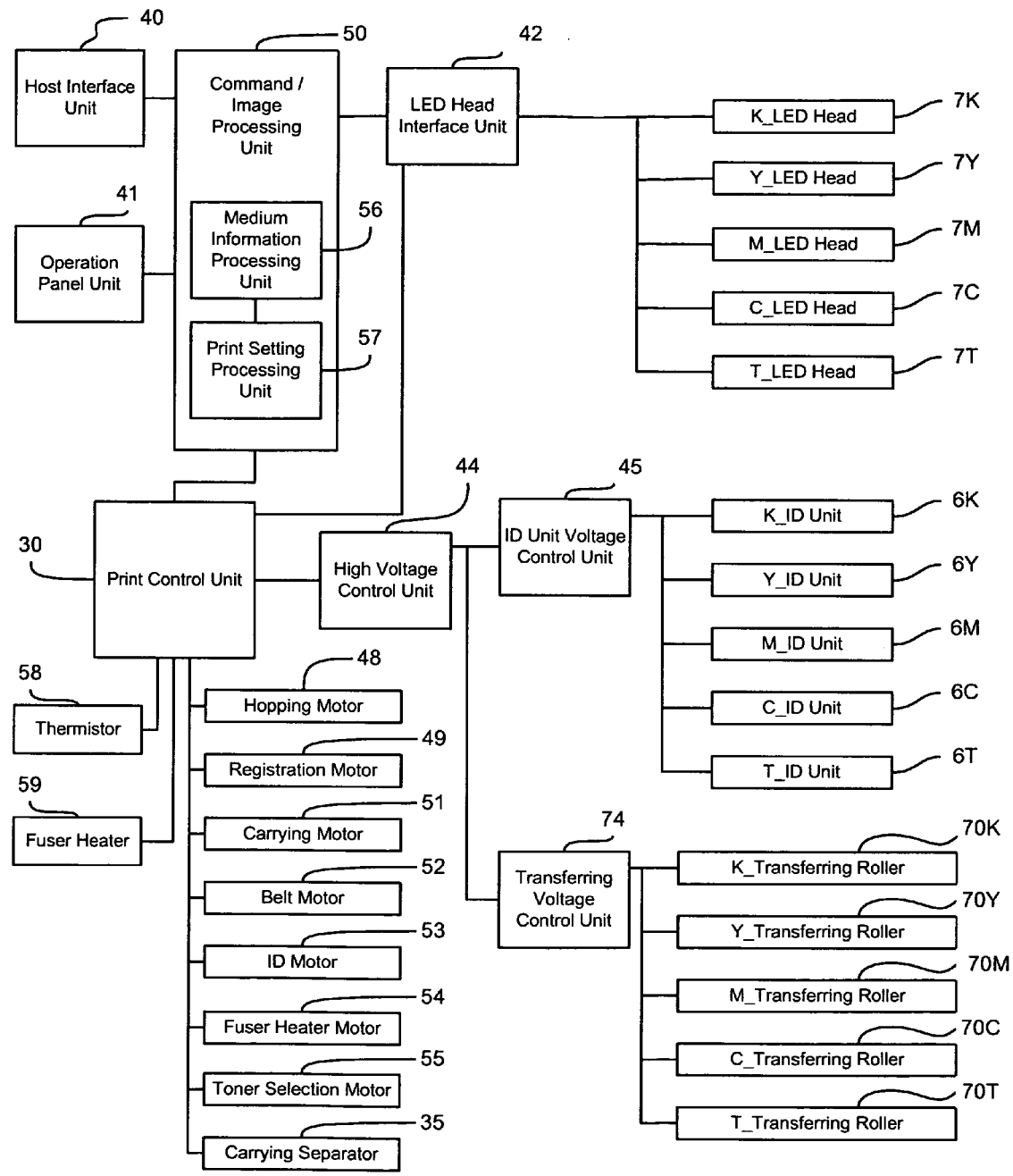
FIG. 8 is a control block diagram of a printer of a third embodiment.

FIG. 8 is a control block diagram of a printer of the third embodiment. A host interface unit 40 functions as an interface with a host computer through the physical hierarchy. An operation panel unit 41 is a panel that a user can operate and is configured either to mount on or to attach to the printer 1. A command/image processing unit 50 sends/receives data to/from the host interface unit 40 and the operation panel unit 41. The command/image processing unit 50 has a medium information processing unit 56 that processes information of the medium obtained from the host interface unit 40 and the operation panel unit 41 and has a print setting processing unit 57.

The command/image processing unit 50 further construes commands and image data from a host side, or expands image data into a bitmap, and then outputs the expanded image data to an LED head interface unit 42. The LED head interface unit 42 processes the image data, which is expanded into the bitmap and comes from the command/image processing unit 50, to adjust it with interfaces of the LED heads 7K-7T.

A print control unit 30 analyzes and calculates information signals from each sensor and each unit, determines conditions, and outputs operation instruction signals to each unit so that the print control unit 30 generally provides structure unit control and applied voltage control. The print control unit 30 drives a hopping motor 48, a registration motor 49, a carrying motor 51, a belt motor 52, an ID motor 53, and a fuser heater motor 54 with a certain timing and speed. The print control unit 30 further drives a toner selection motor 55 and selects and applies one of the development units 82-85 that are provided in the ID unit 6T. The print control unit 30 keeps driving the toner selection motor 55 until the applied development units 82-85 contacts the photoreceptor drum 80, and when the contact is occurred, the driving ends. The print control unit 30 also selectively drives a driving unit that is not shown for the carrying separator 35.

The temperature of a fuser heater 59 is controlled by the print control unit 30 based on a detection value of a thermistor 58. A high voltage control unit 44 receives a control value from the print control unit 30 and controls the voltages of the ID voltage control unit 45 and the transferring voltage control unit 74. The ID unit voltage control unit 45 controls a voltage that is applied to the ID units 6K-6T. A transferring voltage control unit 74 controls a voltage that is applied to the transferring rollers 70K-70T. The operation of the printer 1 of the third embodiment is same as the operation of the printer 1 of the first embodiment (see FIG. 5), except as noted below.

A detailed embodiment is explained below. A regular paper is set as the first recording medium 2. An operation to obtain high gloss for the first recording mediums 2 is explained. In order to obtain the high gloss, the pattern 4 explained in the flow diagram in FIG. 5 is performed. When the command/image processing unit 50 receives a color print instruction for a regular paper, the medium information processing unit 56 and the print setting processing unit 57 select the first recording medium 2 (regular paper) and sends data to the print control unit 30. In order to restrict the glossiness caused by an irregularity of the surface of the regular paper, the print control unit 30 selects transparent toner as a base layer for the regular paper. Because the transparent toner for the regular paper is mounted in the transparent toner T2, the print control unit 30 applies T2 by driving the toner selection motor 55. The print control unit 30 further sends a control value to each control unit to develop/transfer/fuse under the regular paper setting. Because the print control unit 30 develops/transfers/fuses the transparent toner T2 as the base layer on the first recording medium 2 (regular paper), the first recording medium 2 on which image of the transparent toner T2 is formed is created.

The print control unit 30 forwards the first recording medium 2 (regular paper) to the carrying path 8 through the re-carrying path 9 to form a further image on the first recording medium 2 by driving the carrying separator 35. As a result, the print control unit 30 places the first recording medium 2 in a condition where further image can be formed on the first recording medium 2 (regular paper) on which the image of the transparent toner T2 is formed. At the same time, the print control unit 30 applies and selects the transparent toner T1, which has the same particle size as the color toner has, by driving the toner selection motor 55. Next, the print control unit 30 sends the control value to each control unit for equalizing toner development amount of the transparent toner T1 as the upper layer and the color toner and develops/transfers/fuses toner in the order from the bottom, K, Y, M, C and T1, on the first recording medium 2 (regular paper).

Because the transparent toner T2 as the base layer is already formed on the first recording medium 2 (regular paper), the toner layers that is printed on the first recording medium 2 (regular paper) are configured with the following order from the bottom, T2, K, Y, M, C and T1. As a result, the printed first recording medium 2 (regular paper) is ejected to outside of a machine through the ejecting roller 19, and the high gloss print image is obtained.

The present embodiment has the ID units 6K-6C, which are for the color toner to form color toner image on the recording medium 2 or 5, and the ID unit 6T, which forms transparent toner image on the recording medium with the transparent toner selected from a plurality of possible transparent toners. Therefore, the present embodiment can select the transparent toner as the base layer or the upper layer based on the type of the recording medium even though the surface roughness of the recording medium is different, can equalize irregularity of the surface of the recording mediums and of toner image, and can obtain the high gloss print image medium.

(Fourth Embodiment) Next, a fourth embodiment is explained below. In the fourth embodiment, a glossiness sensor 65, which measures surface characteristics of the recording medium 2 or 5, is provided in a carrying path 8. The glossiness sensor 65 is a surface detection unit that is configured to detect input information from the recording medium.

Figure 9:
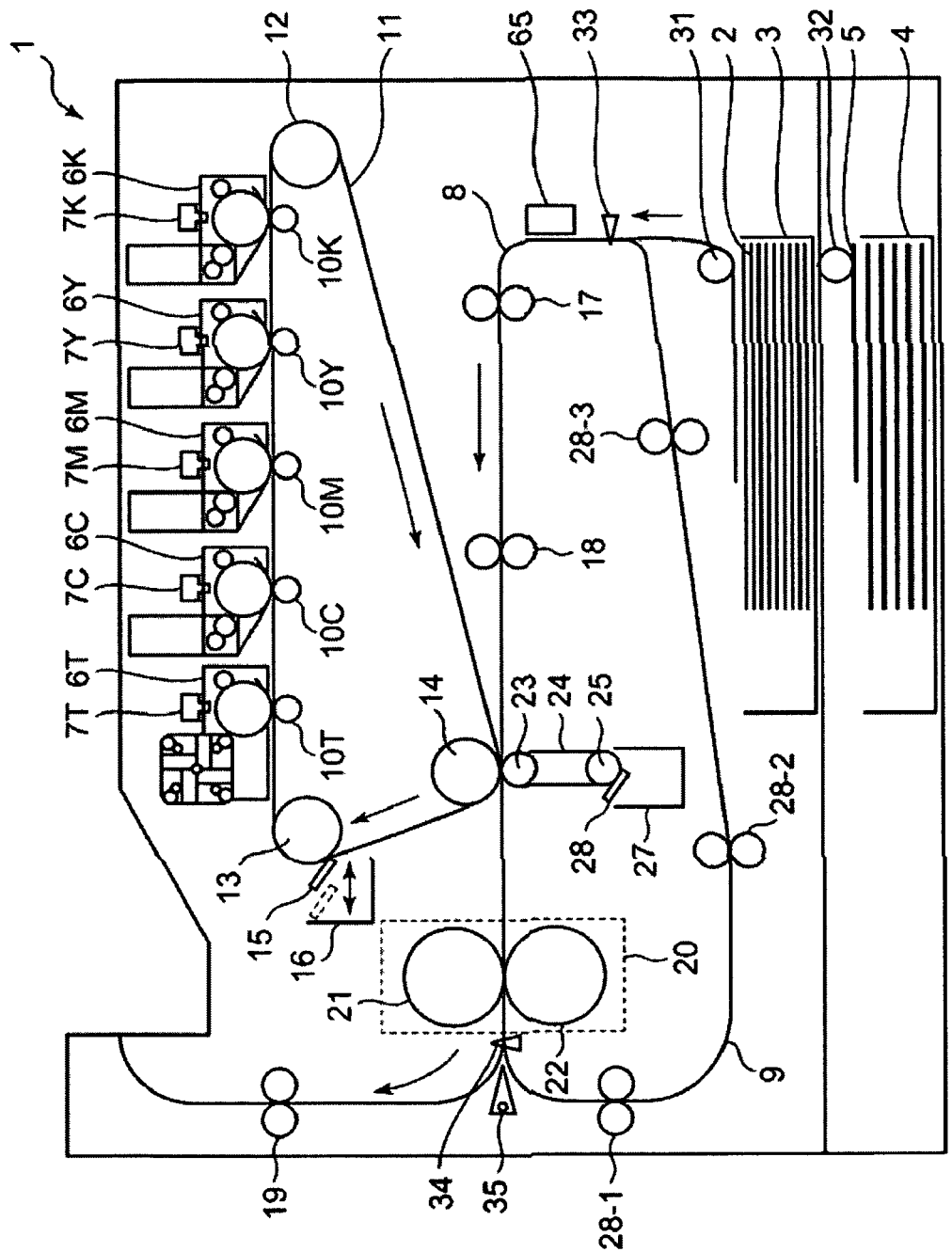
FIG. 9 is a sectional view of a printer of a fourth embodiment.

FIG. 9 is a sectional view of a printer 1 of the fourth embodiment. In the fourth embodiment, the glossiness sensor 65 is located in a position in the middle of the carrying path 8 where transparent toner (T) is not transferred on the recording medium 2 or 5. The glossiness sensor 65 is located in the carrying path 8 and in the area that is close to the surface of the recording medium 2 or 5. The glossiness sensor 65 measures the surface characteristics of the recording medium 2 or 5 that is carried on the carrying path 8. Other structures with respect to the fourth embodiment are same as the first embodiment.

Figure 10:
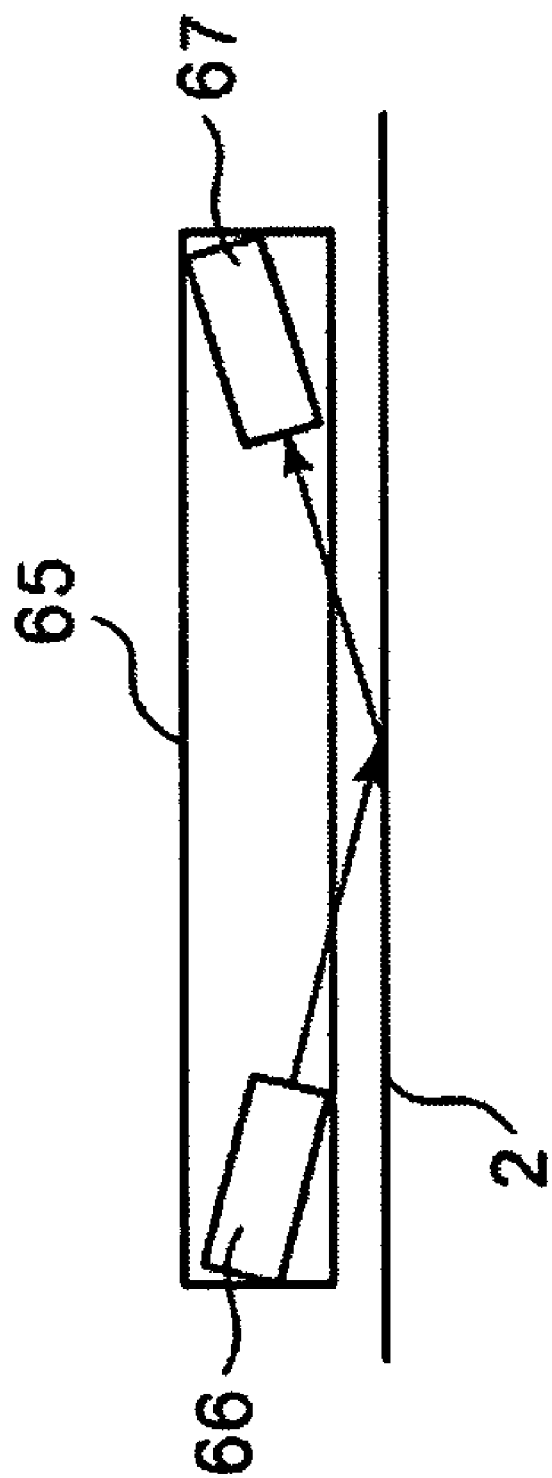
FIG. 10 is a schematic view of a glossiness sensor.

FIG. 10 is a schematic view of the glossiness sensor 65. The glossiness sensor 65 has a light emitting part 66 and a light receiving part 67. Convergent light is irradiated toward the first recording medium 2 from the light emitting part 66, and the reflected light is received by the light receiving part 67 so that the surface roughness of the recording medium is detected. Although FIG. 10 shows the surface roughness of the first recording medium 2 being detected, it is likewise applicable to the second recording medium 5, or any additional recording mediums that are provided in alternate embodiments.

Figure 11:
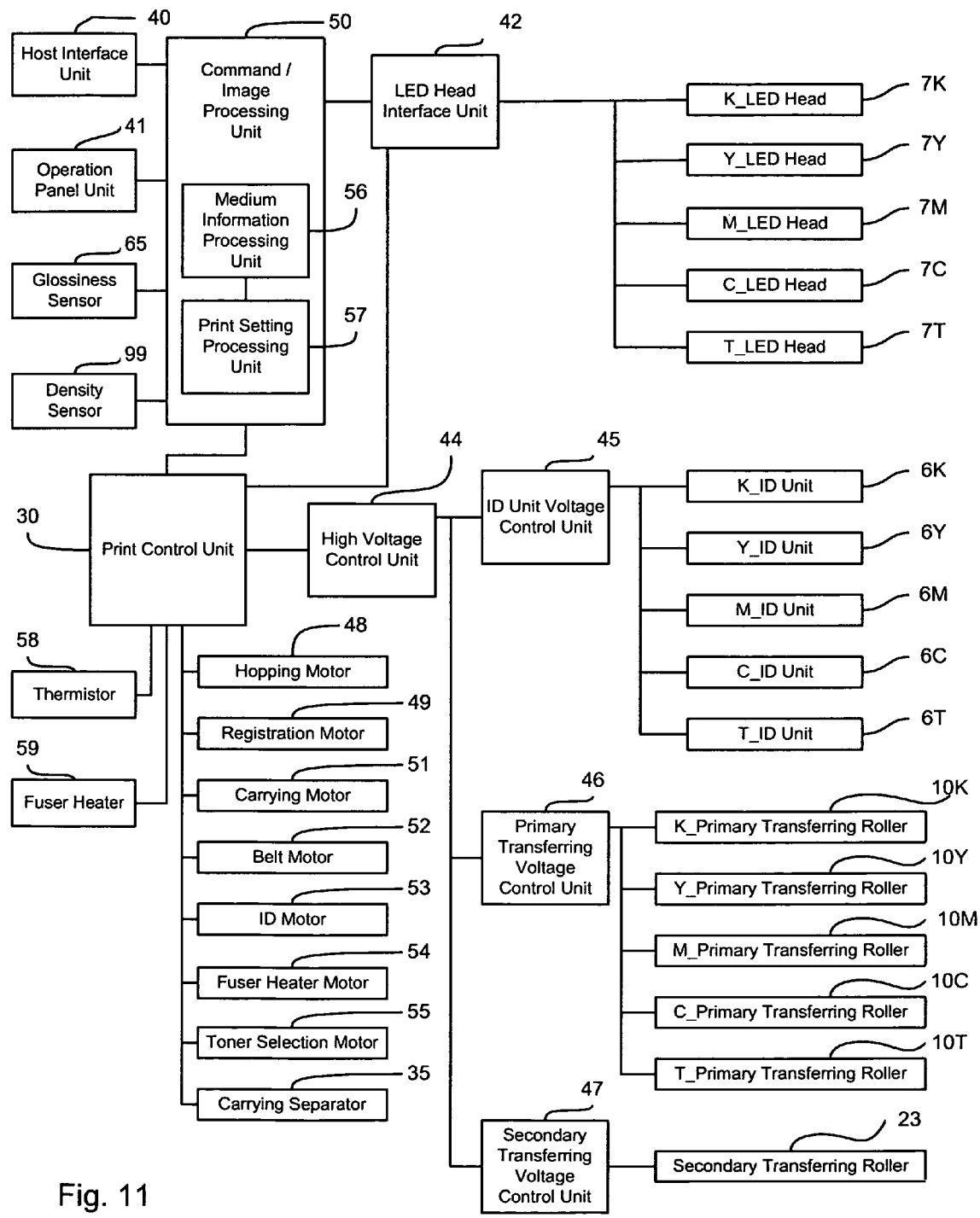
FIG. 11 is a control block diagram of a printer of a fourth embodiment.

FIG. 11 is a control block diagram of a printer of the fourth embodiment. The difference between the fourth embodiment and the first embodiment is the sending of information about the surface roughness of the recording medium 2 or 5 obtained by the glossiness sensor 65 to the command/image processing unit 50. Other structures of the fourth embodiment are same as the first embodiment.

Figure 12:
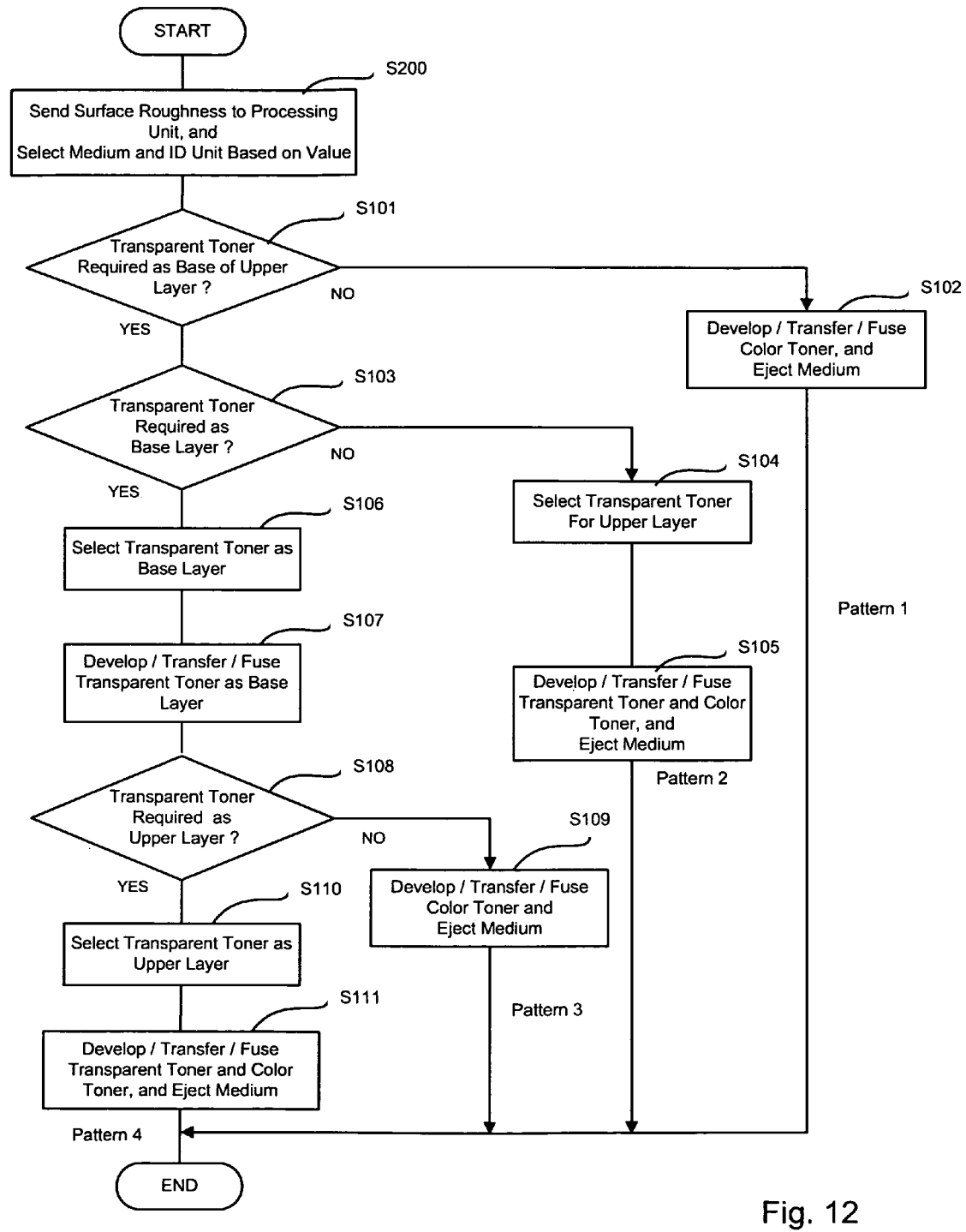
FIG. 12 is a flow diagram of operation of a printer of a fourth embodiment.

FIG. 12 is a flow diagram of the operation of the printer 1 of the fourth embodiment. In this embodiment, information of the surface roughness of the medium obtained by the glossiness sensor 65 is sent to the command/image processing unit 50. Then, a proper medium and the ID unit 6T are selected based on a value input by the operation panel unit 41. The value may be input by the host computer through the host interface unit 40, or be measured through the glossiness sensor 65 (S200). Other operations are same as the first embodiment.

In this embodiment, the surface characteristics of the medium are measured by the glossiness sensor 65. The surface roughness is measured by a measuring device that measures the surface roughness of the medium, and can then select the toner to be used. The glossiness is also measured by the glossiness sensor in addition to the surface roughness, and then the toner can be selected to adjust the glossiness. Alternatively, the surface characteristics of the medium may be selected by, for example, measuring a resistance value of the medium with an electric resistance measuring device, or measuring an image density of the printed image with a density sensor 99, and then toner to be used can be selected.

In this embodiment, the surface characteristics of the recording medium 2 or 5 are measured by locating the glossiness sensor 65 in the carrying path 8. Therefore, even though a user inputs in error or forgets to input through panel operation setting and medium setting, a high gloss print image medium can be obtained.

In the first through fourth embodiments, a plurality of transparent toners are provided that have different particle sizes each other. When there are developers, for example, white toner, UV toner, infrared toner, metallic color toner such as gold color and silver color, these developers can be selectively applied as the base layer or the upper layer for other toner image depending on a user's applications, therefore, special print image can be formed.

What is claimed is:

1. An image forming device comprising:
    a first development unit configured to form a first image on a recording medium with a first developer;
    a second development unit configured to form a second image on the recording medium with at least one of a plurality of second developers that are different from the first developer; and
    a print control unit configured to select the at least one of the plurality of second developers for forming the second image, wherein
    the second developers are transparent developers, and the second image is a transparent image,
    the first developer is color developer, and the first image is a color image, each of the plurality of second developers has a different particle size,
    the print control unit selects a first one of the plurality of second developers having a first particle size when the recording medium has a first roughness, and
    the print control unit selects a second one of the plurality of second developers having a second particle size that is larger than the first particle size when the recording medium has a second roughness that is larger than the first roughness.

2. The image forming device according to claim 1, wherein the image forming device is configured to accommodate a plurality of medium cassettes each corresponding to a different recording medium, respectively, and
    the print control unit selects one of the plurality of different recording mediums from the plurality of medium cassettes based on input information.

3. The image forming device according to claim 2, further comprising:
    an operation unit configured to which the input information is input, wherein
    the print control unit selects the recording medium based on the input information from the operation unit.

4. The image forming device according to claim 2, further comprising:
    an interface unit configured to receive the input information, wherein
    the print control unit selects the recording medium based on the input information from the interface unit.

5. The image forming device according to claim 2, further comprising:
    a surface detection unit configured to detect the input information, wherein
    the print control unit selects the recording medium based on the input information from the surface detection unit.

6. The image forming device according to claim 2, wherein the print control unit forms base and upper second images, the base second image forming a base layer and being positioned between the recording medium and the first image, and the upper second image forming an upper layer and being positioned over the first image.

7. The image forming device according to claim 6, wherein a third particle size of the one of the plurality of second developers that forms the base second image is different from a fourth particle size of the one of the plurality of second developers that forms the upper second image.

8. The image forming device according to claim 6, wherein a third particle size of the one of the plurality of second developers that forms the upper second image is substantially identical to a fourth particle size of a particle of the first developer.

9. The image forming device according to claim 1, wherein the second development unit has a plurality of individual development units, each of the plurality of individual development units containing a different one of the plurality of second developers, the plurality of individual development units being configured to be rotatable around a rotation axis, and one of the plurality of second developers is selected and taken out from one of the plurality of individual development units by rotating the plurality of individual development units around the rotation axis.

10. The image forming device according to claim 1, further comprising:

an intermediate transferring unit, wherein the first development unit and the second development unit are arranged to face the intermediate transferring unit, the first development unit is configured to transfer the first image to the intermediate transferring unit, the second development unit is configured to transfer the second image to the intermediate transferring unit, and the intermediate transferring unit is configured to simultaneously transfer the first image and the second image from the intermediate transferring unit to the recording medium.

11. The image forming device according to claim 1, further comprising:

a transferring unit, wherein the first development unit and the second development unit are arranged to face the transferring unit, the first development unit is configured to transfer the first image to the transferring unit, the second development unit is configured to transfer the second image to the transferring unit, and the transferring unit is configured to transfer the first image and the second image from the transferring unit to the recording medium.

* * * * *